US007215045B1

(12) United States Patent
Myrick

(10) Patent No.: US 7,215,045 B1
(45) Date of Patent: May 8, 2007

(54) ROLL-RING CONDUCTIVE WHEEL

(75) Inventor: Thomas M. Myrick, Warren, NJ (US)

(73) Assignee: Honeybee Robotics, Ltd., New York, NY (US)

( * ) Notice: Subject to any disclaimer, the term of this patent is extended or adjusted under 35 U.S.C. 154(b) by 8 days.

(21) Appl. No.: 10/966,362

(22) Filed: Oct. 15, 2004

Related U.S. Application Data

(60) Provisional application No. 60/512,132, filed on Oct. 17, 2003.

(51) Int. Cl.
*H01R 39/00* (2006.01)
*H01R 39/22* (2006.01)
*H01R 39/64* (2006.01)
*H02G 5/06* (2006.01)

(52) U.S. Cl. .......................... 307/147; 439/17; 439/19

(58) Field of Classification Search ................ 307/147; 439/17, 19
See application file for complete search history.

(56) References Cited

U.S. PATENT DOCUMENTS

| | | | | | |
|---|---|---|---|---|---|
| 2,409,600 | A * | 10/1946 | Trautschold | ................ | 310/219 |
| 3,271,723 | A * | 9/1966 | Willing | ................ | 439/17 |
| 3,489,982 | A * | 1/1970 | Dauphinee | ................ | 439/19 |
| 4,183,598 | A * | 1/1980 | Oude Aarninkhof | ......... | 439/17 |
| 4,372,633 | A * | 2/1983 | Allen et al. | ................ | 439/17 |
| 5,178,546 | A * | 1/1993 | Dickerson | ................ | 439/13 |
| 5,321,583 | A * | 6/1994 | McMahon | ................ | 361/770 |
| 5,501,604 | A * | 3/1996 | Roopnarine et al. | .......... | 439/19 |
| 5,829,986 | A * | 11/1998 | Kong | ................ | 439/13 |
| 5,851,120 | A * | 12/1998 | Sobhani | ................ | 439/17 |
| 5,853,294 | A * | 12/1998 | Rehder | ................ | 439/17 |
| 6,299,454 | B1 * | 10/2001 | Henderson et al. | .......... | 439/19 |
| 6,582,237 | B2 * | 6/2003 | Jacobson | ................ | 439/19 |
| 6,612,847 | B2 * | 9/2003 | Canizales, Jr. | ............... | 439/17 |
| 2002/0034887 | A1 * | 3/2002 | Dollhofer et al. | ............. | 439/17 |

* cited by examiner

*Primary Examiner*—Burton S. Mullins
*Assistant Examiner*—Adi Amrany
(74) *Attorney, Agent, or Firm*—Leighton K. Chong; Godbey Griffiths Reiss & Chong

(57) ABSTRACT

A roll-ring conductive wheel is used to conduct electricity between the inner and outer races of rotating or moving parts. The conductive wheel is a thin-walled metal cylinder with a plurality of spokes connecting the outer cylindrical wall to a central hub. The preferred spokes are arcuate and the wheel is made flexible so that it can be compressed to an elliptical shape between the inner and outer conductive races for good electrical contact and to absorb slight deflections or gap variations between the races. The conductive wheel can have other shapes depending on the configuration of moving parts, such as a truncated cone shape for conical or wedge-shaped races.

10 Claims, 7 Drawing Sheets

ROLL-RING CONDUCTIVE WHEEL

This U.S. patent application claims the priority of U.S. Provisional Application No. 60/512,132 filed on Oct. 17, 2003, entitled "Roll-Ring conductive Wheel", by the same inventor.

This invention was made with Government support under Contract No. F29601-03-C-0219 awarded by the U.S. Air Force. The Government has certain rights in this invention.

TECHNICAL FIELD

The invention is directed to a conductive element suited for any application where there is a need to conduct electricity across rotating or moving elements. This conduction can be used for transferring electricity in strengths that range from low signals (e.g. communication signals) to high power (e.g. lightning grounding paths) in cases where continuous relative rotation interrupts the electric path or where the use of cables is not appropriate.

BACKGROUND OF INVENTION

Prior art consists of graphite or fine wire brushes that rub against conductive rings that in turn, pass electricity across a rotating device. Other methods use a thin wall metal ring (or rings) that is lightly compressed into an ellipse that conducts between two concentric rings. When multiple rings are used, they would require a means of separation that is accomplished by way of planetary gears that act as separators or plastic spacers placed between each conducting ring.

The disadvantages of prior art are many. Graphite or thin wire brushes are a source of electrical noise that is detrimental when used to pass signal. Additionally, these methods generate wear and particles that further degrades the performance of the conductive path. These devices are prone to produce sparks that can also degrade their performance and become hazardous if employed in volatile environments or areas where combustibles are stored. Although thin wall metal ring devices produce less noise, wear and spark potential, they cannot be made to provide a large contact area that is important in applications where large amounts of current is needed to be conducted across a rotating device. Furthermore, it is inherently difficult to introduce multiple rings in an effort to increase the current carrying capacity of the electrical path without the introduction of spacer materials that will in turn, rub against the rings or other separation components causing particle generation.

SUMMARY OF INVENTION

In accordance with the present invention, a conductive wheel comprises a roll-ring formed with an outer band, a central hub defining a rolling axis of the roll-ring, and a plurality of spokes extending between said central hub and said outer band, wherein said outer band extends with a predetermined width in the axial direction to form an outer contact surface, and wherein said spokes provide a flexible rolling structure to the roll-ring such that when an external contacting part is loaded against its periphery, the outer contact surface of said outer band provides a rectangular area contact surface with the external contacting part.

This invention has advantages over prior art in that the conductive wheels travel through pure rolling motion and therefore produces very little noise, particle generation, wear or hazardous sparks. Additionally, the geometry of the outer surface of the wheel is straight walled cylinders/cones as opposed to roll rings of prior art that are convex. Straight walled cylindrical geometries produce line contact that becomes rectangular area contact when loaded. Convex shaped outer surfaces produce point contact that becomes circular area contact when loaded that have by far, less contact area than rectangular area contact and therefore, less current carrying capacity. This pure rolling motion, combined with rectangular area contact, enables the wheels to be preloaded to a greater extent, thus offering an even larger contact area that provides much higher current carrying capacity without the risk of excessive wear, surface breakdown or particle generation. This gives the invention a very high service life.

The introduction of flexible spokes further enhances the preload with the inner and outer race without a reduction in the fatigue strength of the material that further increases the current carrying capacity while providing a connection to the central hub. With a centrally located hub, a separator can be installed that will insure alignment of and separation between each of the many roll wheels that can be included in the design. This central hub allows the insertion of bearings and pins as a means of connecting each wheel to a separator, thus insuring the absence of particle generating rubbing action within the separation mechanism. By placing several wheels within the inner and outer race, better performance is offered with an increase in redundancy, current carrying capacity and load balancing. The conductive wheel invention can also be arranged to act as a discrete electrical conduit (a direct replacement for brushes), in applications where a plurality of wheels places around a conductive ring are not desired.

Other objects, features, and advantages of the present invention will be explained in the following detailed description of the invention having reference to the appended drawings.

DETAILED DESCRIPTION OF INVENTION

Figure 1A:
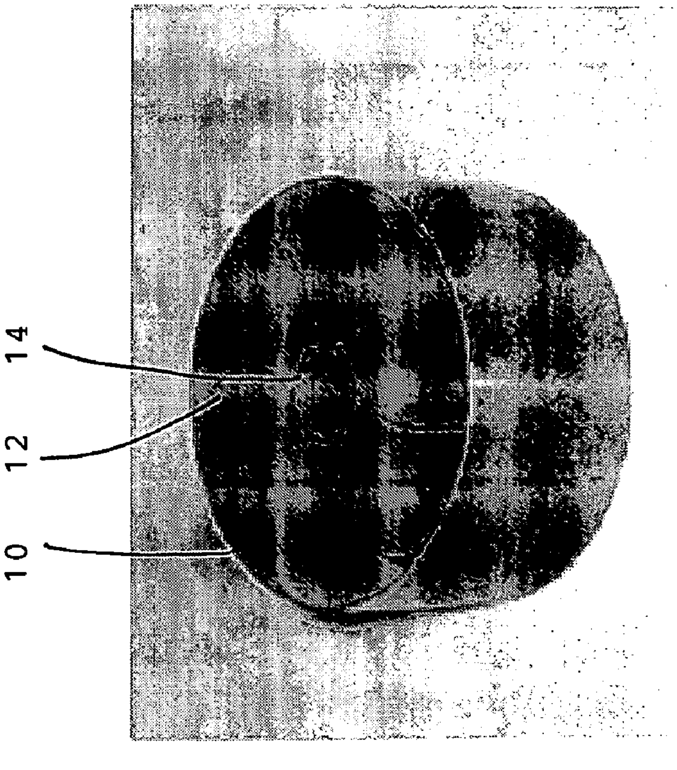
FIG. 1A shows an external view of a roll-ring conductive wheel with curved spokes.
Figure 1B:
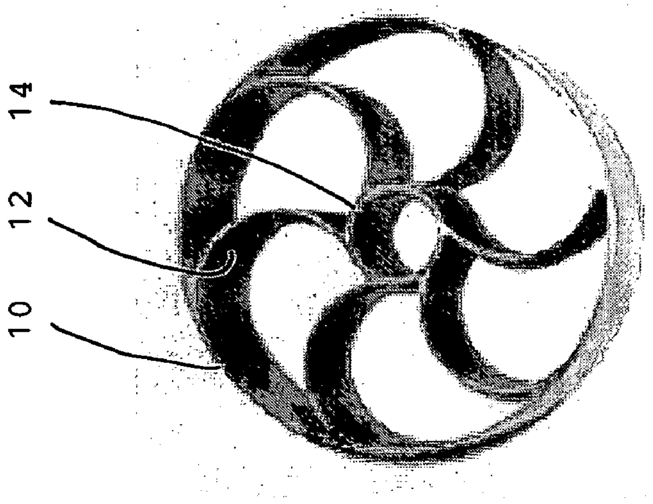
FIG. 1B shows a plan view thereof.
Figure 2:
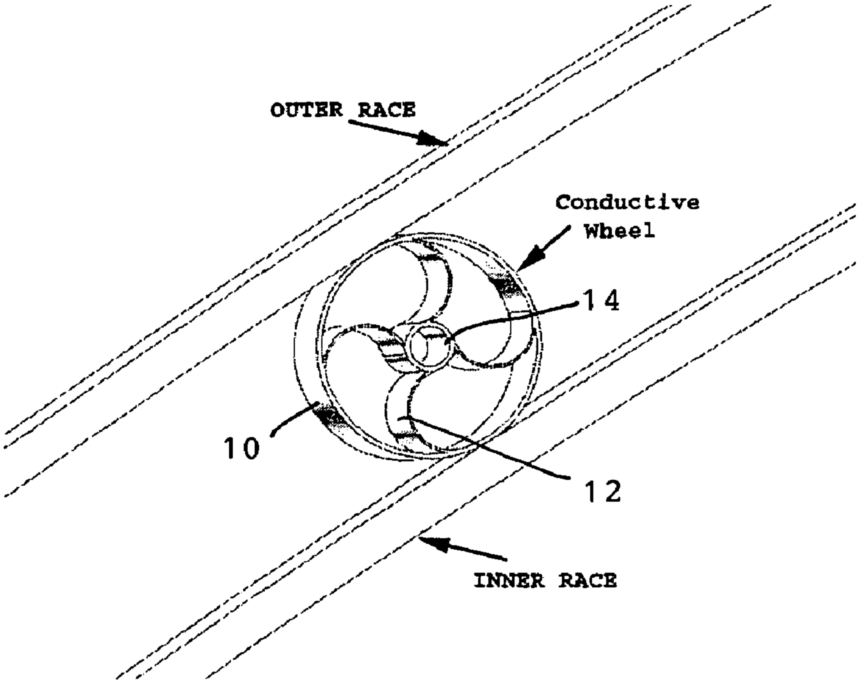
FIG. 2 shows a roll-ring between inner and outer linear races.
Figure 3:
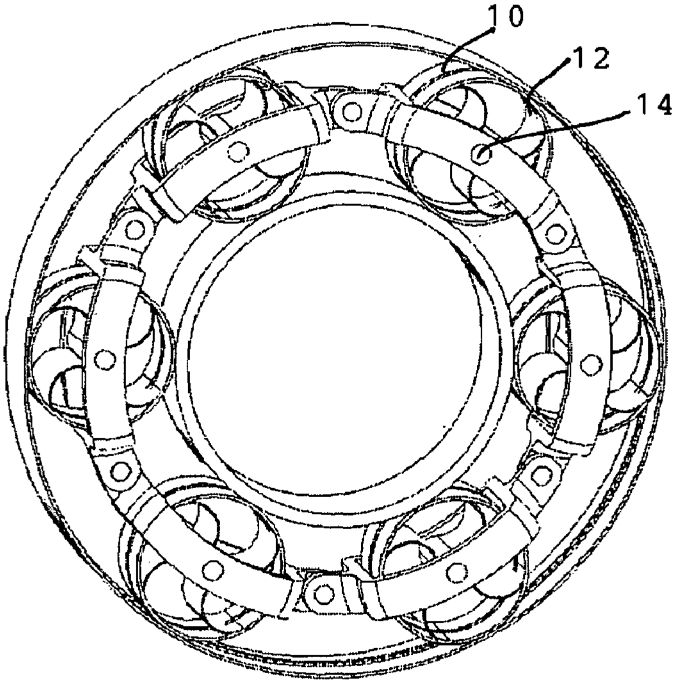
FIG. 3 shows a rotary application of the invention between two concentric rings.

Referring to FIGS. 1A–1B, the conductive wheel is formed as a roll-ring having a thin walled metal cylinder 10 that has a plurality of spokes 12 connecting the cylinder to a central hub 14. The shape and number of spokes can vary greatly, depending on the application. The wheel is flexible so that it can be compressed between two conductive surfaces. FIG. 2 shows a roll-ring between inner and outer linear races. FIG. 3 shows a rotary application of the invention between two concentric rings that undergo relative motion between them. By compressing the wheel into an elipse, it serves to provide a good electrical connection between the two rings and allows for slight misalignment or gap variation between the rings while still providing a conductive path. The formed elipse also greatly increases the contact area between the wheel and each of the rings. This is important for noise reduction and high current flow.

As one ring rotates or moves with respect to the other ring, the wheel undergoes pure rolling motion while the major and minor axes of the elipse continually change direction. The shape, number and thickness of each of the spokes as well as the diameter and thickness of the cylindrical portion of the wheel can be "tuned" so as to provide a broad range of stiffness and therefore preload/contact area to the inner and outer rings. The central hub serves as a connection point for a separator to be installed for the purpose of maintaining alignment of and separation between multiple wheels. The central hub can include (but is not limited to) small ball bearings that provide pure rolling motion of the wheel with respect to the mounting shaft on the separator, thus minimizing or eliminating any rubbing action that might cause particle generation.

Figure 5:
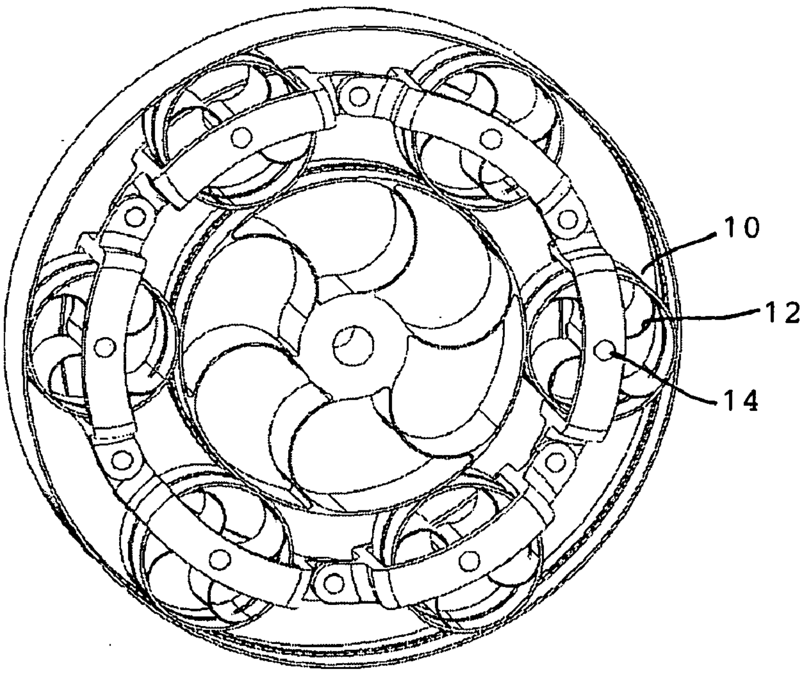
FIG. 5 shows a rotary version shown with the addition of a flexible inner race.

The inner and/or outer race can be made in the same flexible way as the conductive wheels so as to further increase the conductive path between the wheel and the inner/outer race. This could also allow for greater compliance to co-axial misalignment in rotary devices. By geometry, the contact area between the wheel and inner race will always be less than the contact area between the wheel and the outer race as the wheel/inner race interface is diverging while the wheel/outer race is converging. For example, by making the inner race flexible, the contact area between the wheel and inner race can be enhanced or even made to match the contact area between the wheel/outer races, thus improving the overall current carrying capacity of the invention, as shown in FIG. 5.

Figure 6:
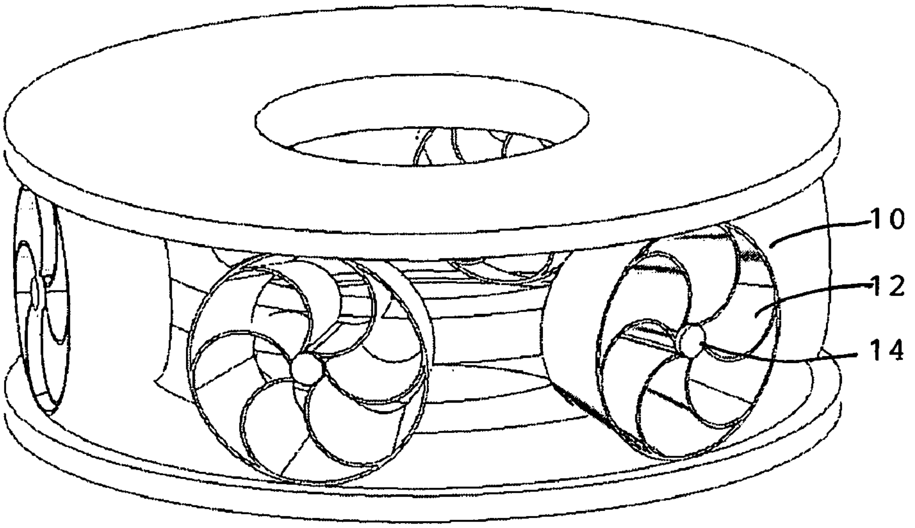
FIG. 6 shows a rotary conical wheel version.
Figure 7:
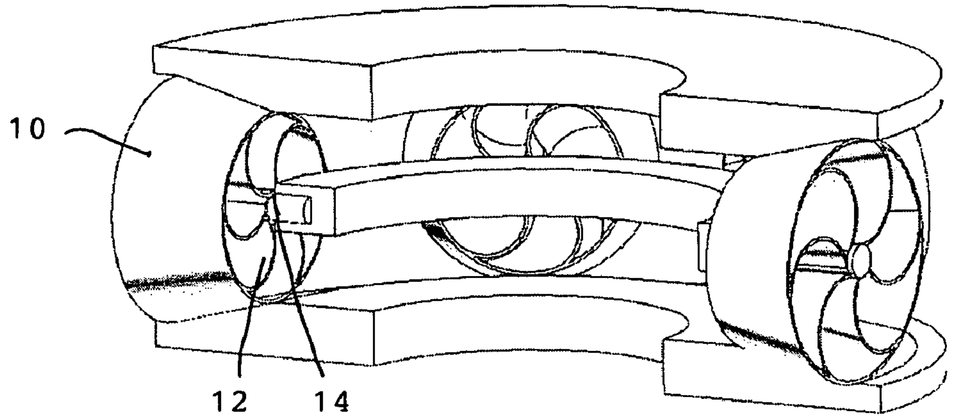
FIG. 7 shows the rotary conical wheel version in sectional view.

The wheels can be shaped as truncated cones that mate with conical upper and lower races or wedge shaped linear races, as shown in FIGS. 6–7. This geometry can improve the ease of assembly as well as contain and align the wheels with less requirements placed on the separator and other elements within the design that are needed for the purpose of maintaining proper wheel alignment.

Figure 4:
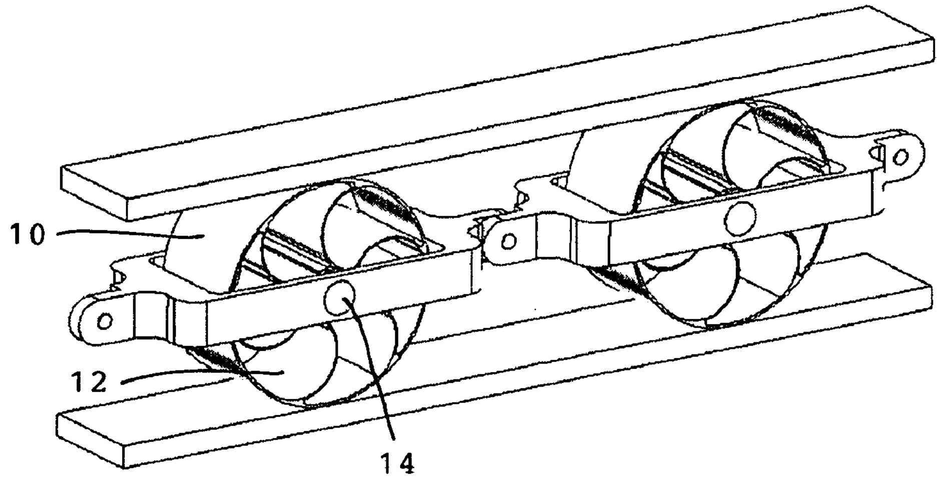
FIG. 4 shows a linear application using a plurality of roll-rings.
Figure 8:
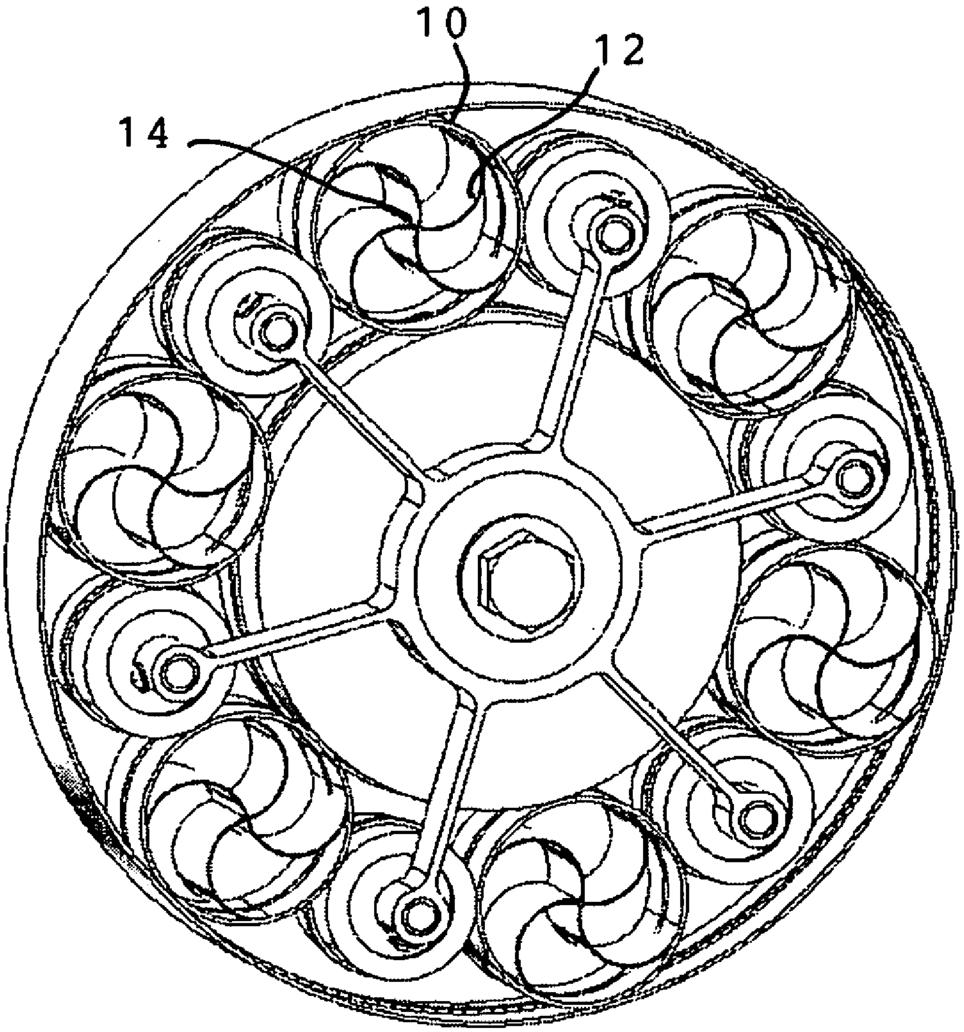
FIG. 8 shows a rotary version with spokes and roller separator.
Figure 9:
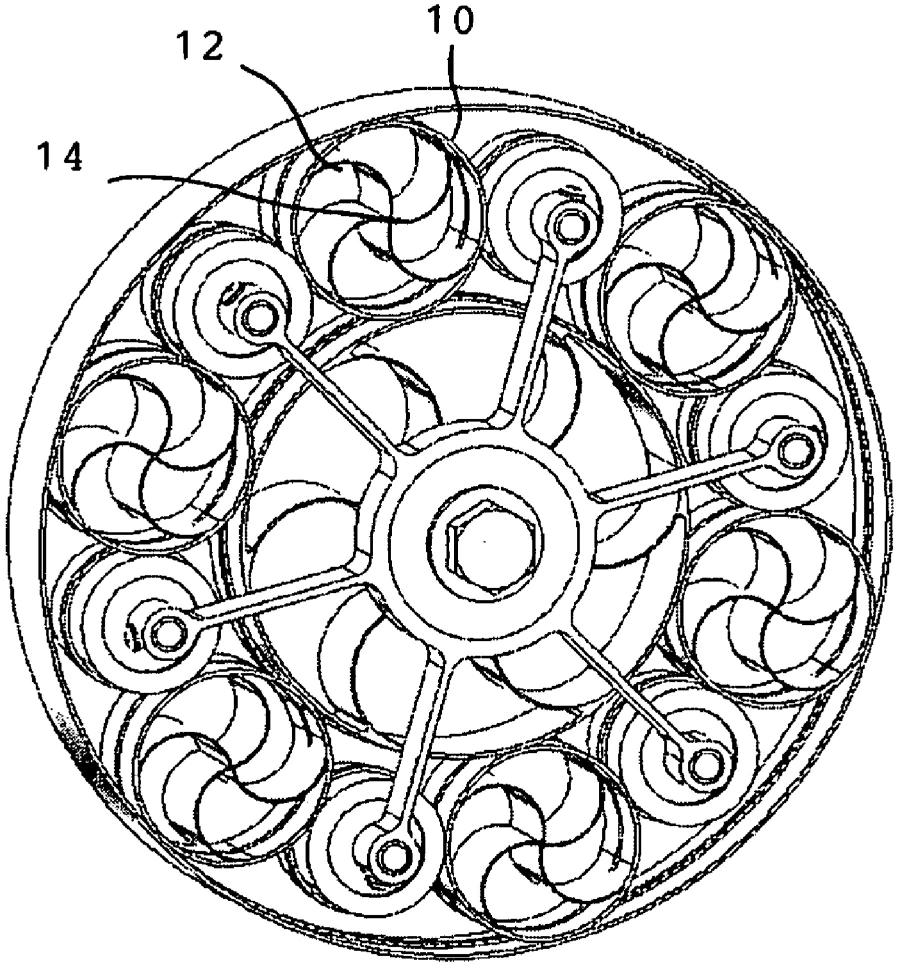
FIG. 9 shows a rotary version with spokes and roller separator including a flexible inner ring.

For applications that require a multiple of conductive wheels, a wheel separator device can be added that can take many forms. A linkage like device that attaches to the central hub of each conductive wheel is one way of accomplishing this task, again referring to FIGS. 3–5. Another method of separating the conductive wheels is to include rollers placed between each of the conductive wheels that maintain pure rolling motion while keeping the conductive wheels apart. In this example, a flexible spoke mechanism attaches to each of the rollers so as to maintain the radial and axial alignment of each of the conductive wheels while still allowing each conductive wheel to move relative to one another as they elastically deform into ellipses, as shown in FIGS. 8–9. Although two methods of separation are disclosed here, there is a multitude of ways of maintaining a separation of the conductive wheels.

Figure 10:
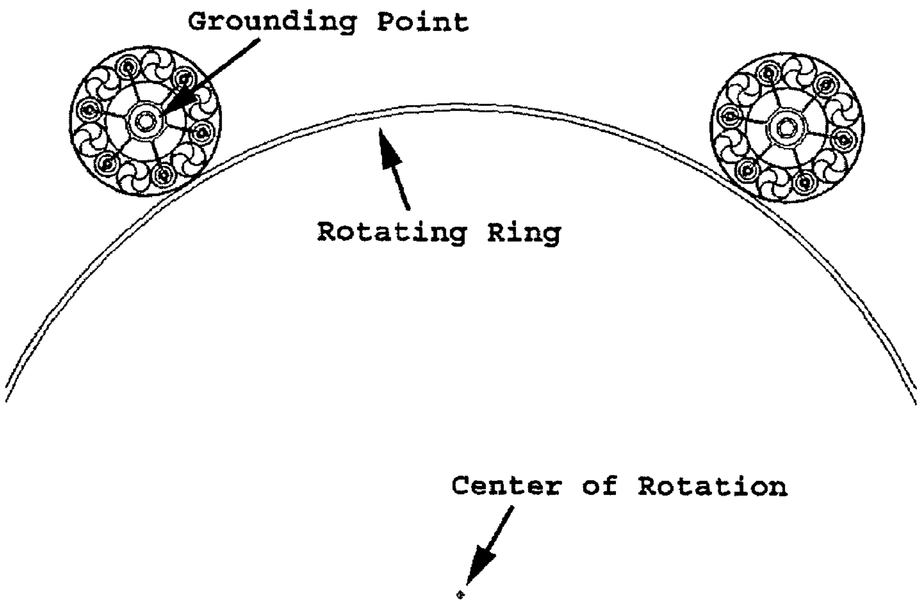
FIG. 10 shows a discrete application wherein the roll-rings serve as rotary grounding points for a rotating part.

For applications where it is not desired to have a plurality of conductive wheels placed around a rotating inner ring, a conductive wheel arrangement as shown in FIG. 10 can be used. This arrangement does not require an outer ring to transfer an electrical connection from the rotating ring. Rather, the assembly is placed in contact with the rotating ring and goes through pure rolling motion while maintaining a preloaded contact with the rotating ring. This arrangement of elements offers a direct replacement to conventional brushes while maintaining a preloaded, pure rolling contact with the rotating ring.

In the present invention, the cylindrical wheel travels through pure rolling motion. This dramatically reduces electrical noise, particle generation, wear and sparks which in turn allows the wheel to be preloaded to a much greater extent without causing increased wear or galling that translates into a higher power transfer. The geometry of the outer surface of the conductive wheel is cylindrical or conical and therefore produces line contact with the inner and outer race that becomes rectangular area contact when loaded. The addition of flexible spokes further increases the preload capability of the wheel without an increase in material stress while at the same time reduces the electrical resistance of the conductive wheel.

A centrally located hub that maintains its true center with respect to the compressed elliptical form, enables a separator that can include pins and bearings (but not limited to) to be included that maintains alignment of and separation between multiple conductive wheels that can be incorporated while eliminating any rubbing action that can produce particles, wear and life limitations. The inner or outer race can be made as to perform like the flexible wheels, thus further increasing the contact area of the wheel/inner race/outer race interface.

The device can act as a stand-alone mechanism for providing electricity across a rotating element where a plurality of wheels or an out ring placed around a conductive ring is not desired. The conductive wheels can be used as structural support bearings for both linear and rotational applications in addition to their role as electrically conductive elements. The conical wheel embodiment offers even greater area contact with the inner and outer races than the cylindrical wheel design.

It is to be understood that many modifications and variations may be devised given the above description of the principles of the invention. It is intended that all such modifications and variations be considered as within the spirit and scope of this invention, as defined in the following claims.

The invention claimed is:

1. A conductive wheel comprising a roll-ring formed with an outer band, a central hub defining a rolling axis of the roll-ring, and a plurality of spokes extending between said central hub and said outer band, wherein said outer band extends with a predetermined width in the axial direction to form an outer contact surface, and wherein said spokes provide a flexible rolling structure to the roll-ring such that when an external contacting part is loaded against its periphery, the outer contact surface of said outer band provides a rectangular area contact surface with the external contacting part.

2. A conductive wheel according to claim 1, wherein said outer band is a straight walled cylinder.

3. A conductive wheel according to claim 1, wherein said outer band is a straight walled cone.

4. A conductive wheel according to claim 1, wherein said plurality of spokes have curved shapes.

5. A conductive wheel according to claim 1, wherein said plurality of spokes are made of a flexible material.

6. A conductive wheel according to claim 1, wherein said central hub is used for the insertion of a bearing or pin.

7. A conductive wheel according to claim 1, wherein said wheel is used between inner and outer linear races.

8. A conductive wheel according to claim 1, wherein said wheel is used between inner and outer concentric rings.

9. A conductive wheel according to claim 1, wherein said wheel is arranged to act as a grounding point for a rotating part.

10. A conductive wheel according to claim 1, wherein a plurality of said wheels are connected together using said central hub as a mounting point for connecting each wheel to a separator.

* * * * *